United States Patent
Ekpenyong et al.

(10) Patent No.: US 11,166,299 B2
(45) Date of Patent: Nov. 2, 2021

(54) DATA RETRANSMISSION METHOD, DEVICE AND TERMINAL

(71) Applicant: DATANG MOBILE COMMUNICATIONS EQUIPMENT CO., LTD., Beijing (CN)

(72) Inventors: Tony Ekpenyong, Beijing (CN); Wei Bai, Beijing (CN); Yanping Xing, Beijing (CN); Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/259,121

(22) PCT Filed: Jul. 24, 2019

(86) PCT No.: PCT/CN2019/097454
§ 371 (c)(1),
(2) Date: Jan. 8, 2021

(87) PCT Pub. No.: WO2020/024855
PCT Pub. Date: Feb. 6, 2020

(65) Prior Publication Data
US 2021/0250970 A1    Aug. 12, 2021

(30) Foreign Application Priority Data

Aug. 3, 2018  (CN) .......................... 201810878140.7

(51) Int. Cl.
*H04W 72/04* (2009.01)
*H04W 72/12* (2009.01)
(Continued)

(52) U.S. Cl.
CPC ....... *H04W 72/1268* (2013.01); *H04L 1/0003* (2013.01); *H04L 1/0009* (2013.01); *H04L 1/1887* (2013.01); *H04W 72/1289* (2013.01); *H04W 72/14* (2013.01); *H04W 76/27* (2018.02)

(58) Field of Classification Search
CPC ............. H04W 72/1268; H04W 72/14; H04W 72/1289; H04W 76/27; H04L 1/1887; H04L 1/0009; H04L 1/0003
See application file for complete search history.

(56) References Cited

U.S. PATENT DOCUMENTS

2015/0270868 A1    9/2015  Park
2017/0317790 A1*  11/2017  Yao ........................ H04L 1/1812
(Continued)

FOREIGN PATENT DOCUMENTS

CN    104080161 A    10/2014
CN    104780608 A    7/2015
(Continued)

OTHER PUBLICATIONS

International Search Report in international aplication No. PCT/CN2019/097454, dated Sep. 27, 2019.
(Continued)

*Primary Examiner* — Walli Z Butt
(74) *Attorney, Agent, or Firm* — Ladas & Parry, LLP

(57) ABSTRACT

Provided are a data retransmission method and device, and a terminal. The method includes: acquiring a radio resource control (RRC) signaling, wherein the RRC signaling at least comprises a first configuration field and a second configuration field; the first configuration field is a configured grant (ConfiguredGrantConfig) field, and the second configuration field is a physical uplink shared channel configuration (PUSCH-config) field; in the case that a base station dynamically schedules the terminal to perform a retransmission of a PUSCH, determining a parameter set for the (Continued)

retransmission according to a configuration parameter comprised in the first configuration field and a configuration parameter comprised in the second configuration field; and performing the retransmission of the PUSCH according to the determined parameter set.

20 Claims, 2 Drawing Sheets

(51) Int. Cl.
     *H04L 1/00*     (2006.01)
     *H04L 1/18*     (2006.01)
     *H04W 72/14*    (2009.01)
     *H04W 76/27*    (2018.01)

(56) References Cited

U.S. PATENT DOCUMENTS

| | | | |
|---|---|---|---|
| 2018/0295651 A1* | 10/2018 | Cao | H04W 72/042 |
| 2018/0331792 A1* | 11/2018 | Yang | H04W 72/04 |
| 2021/0160917 A1* | 5/2021 | Goto | H04W 72/12 |

FOREIGN PATENT DOCUMENTS

| | | |
|---|---|---|
| CN | 107342350 A | 11/2017 |
| CN | 108322936 A | 7/2018 |
| WO | 2017078501 A1 | 5/2017 |

OTHER PUBLICATIONS

Written Opinion of the International Searching Authority in the international application No. PCT/CN2019/097454, dated Sep. 27, 2019, with English translation provided by Google Translate.
Ericsson "URLLC Techniques for PUSCH" 3GPP TSG-RAN WG1 Meeting #92, R1-1802881, Mar. 2, 2018, entire document.
Extended EP search report from EP app. No. 19844994.4, dated Sep. 9, 2021, all pages.
Huawei et al: "Misllaneous corrections for URLLC (H003-H009)", 3GPP Draft; R2-1810442, 3rd generation partnership project (3GPP), 3GPP TSG-RAN WG2 Meeting #AH1807; Montreal, Canada, Jul. 2-6, 2018, all pages.

* cited by examiner

DATA RETRANSMISSION METHOD, DEVICE AND TERMINAL

CROSS-REFERENCE TO RELATED APPLICATIONS

This application is the U.S. national phase of PCT Application No. PCT/CN2019/097454 filed on Jul. 24, 2019, which claims a priority to Chinese Patent Application No. 201810878140.7 filed in China on Aug. 3, 2018, the disclosures of which are incorporated herein by reference in their entireties.

TECHNICAL FIELD

The present disclosure relates to the technical field of communication, in particular to a data retransmission method, device and terminal.

BACKGROUND

With the development and change of mobile communication service demand, several organizations such as third generation partnership project (3GPP) begin to study $5^{th}$ generation new radio access technology (5G new RAT, i.e. 5G NR) for future mobile communication system. In a 5G NR system, an important requirement is low latency and high reliable communication, and there are some transmission schemes such as ultra reliable & low latency communication (URLLC).

For URLLC service, a dynamic scheduling scheme is supported in the NR standard. In the uplink dynamic scheduling scheme, firstly a base station (gNB) uses a physical uplink shared channel configuration (PUSCH-Config) of a radio resource control (RRC) signaling to configure transmission of a PUSCH, and then the base station schedules through a physical downlink control channel (PDCCH) a terminal to perform the transmission of the PUSCH according to configuration parameters in the PDCCH and configuration parameters in the PUSCH-Config.

For the URLLC service, a grant-free scheme is supported in the NR standard to reduce radio transmission latency. In the grant-free scheme, firstly the base station configures the transmission of the PUSCH by using a configured grant (ConfiguredGrantConfig) field of the RRC signaling, and after the grant-free transmission is activated, the terminal performs PUSCH transmission according to configuration parameters in the ConfiguredGrantConfig field (and configuration parameters in an active signaling).

The scheme in the related art is as follows. An initial transmission uses the grant-free transmission configured based on the ConfiguredGrantConfig field and the active signaling, and a retransmission uses the dynamic scheduling configured based on the PUSCH-Config and the PDCCH.

The NR introduces a grant-free method, that is, before an uplink transmission, a scheduling request does not need to be transmitted to the base station, and a PDCCH indication of the base station also does not need to be waited; instead, the terminal determines by itself to perform the uplink transmission on a resource configured by a high-layer signaling.

The grant-free schemes in NR are classified into a first type of grant-free (Type 1 grant-free) and a second type of grant-free (Type 2 grant-free). The RRC configuration signaling of the ConfiguredGrantConfig field also applies to Type 1 grant-free and Type 2 grant-free.

For the transmission of the PUSCH of Type 1 grant-free, firstly the base station performs the RRC configuration of the ConfiguredGrantConfig field, and then the terminal transmits data directly according to the configuration when the data transmission is required, which can reduce the latency of uplink data.

For the transmission of the PUSCH of Type 2 grant-free, firstly the base station performs the RRC configuration of the ConfiguredGrantConfig field, and then the base station activates the uplink transmission through the active signaling; the terminal transmits data according to the configuration when the data transmission is required after receiving the active signaling, so that the latency of uplink data can be reduced, and the problem of low utilization rate caused by resource reservation is partially solved. In practical application, a terminal in a scene with particularly high latency requirement and controllable arrival of service data can use the transmission of the PUSCH of Type 2 grant-free to realize low latency uplink data transmission.

For the URLLC service, the transmission of the PUSCH uses the configuration parameters in the ConfiguredGrantConfig field when the grant-free scheme is used for the initial transmission; when the same data is retransmitted through dynamic scheduling, the transmission of the PUSCH in the related art uses the configuration parameters in the PUSCH-Config. In general, the configuration parameters in the PUSCH-Config and the configuration parameters in the ConfiguredGrantConfig fields lead to different performances (e.g., reliability, latency) of the PUSCH, and sometimes even collision may occur.

SUMMARY

An objective of the present disclosure is to provide a data retransmission method and device, and a terminal, so as to solve the problem in the related art that transmission collision of the PUSCH may occur due to a configuration parameter in a PUSCH-Config and a configuration parameter in a ConfiguredGrantConfig.

In order to solve the above problem, an embodiment of the present disclosure provides a data retransmission method for a terminal, including:

acquiring a radio resource control (RRC) signaling, wherein the RRC signaling at least includes a first configuration field and a second configuration field; the first configuration field is a configured grant (ConfiguredGrantConfig) field, and the second configuration field is a physical uplink shared channel configuration (PUSCH-config) field;

in the case that a base station dynamically schedules the terminal to perform retransmission of a PUSCH, determining a parameter set for retransmission according to a configuration parameter included in the first configuration field and a configuration parameter included in the second configuration field; and performing the retransmission of the PUSCH according to the determined parameter set.

In addition, the determined parameter set for the retransmission includes:

another parameter in the first configuration field other than a first parameter set in the first configuration field; and a parameter that is in the second configuration field and corresponds to the first parameter set, wherein the first parameter set is a radio resource control-Configured Uplink Grant (rrc-ConfiguredUplinkGrant).

In addition, the determined parameter set for the retransmission includes:

a modulation and coding scheme table (mcs-Table) and a waveform setting (transformPrecoder) in the first configuration field; and another parameter in the second configuration field other than the mcs-Table and the transformPrecoder in the second configuration field.

In addition, the determined parameter set for the retransmission includes an mcs-Table;

when a waveform corresponding to a transformPrecoder in the first configuration field is same as a waveform corresponding to a transformPrecoder in the second configuration field, the mcs-Table is an mcs-Table in the first configuration field;

when the waveform corresponding to the transformPrecoder in the first configuration field is different from the waveform corresponding to the transformPrecoder in the second configuration field, the mcs-Table is an mcs-Table that is bound to the waveform corresponding to the transformPrecoder in the second configuration field and corresponds to the mcs-Table in the first configuration field.

In addition, the determined parameter set for the retransmission includes an mcs-Table;

when a name of an mcs-Table in the first configuration field is a preset name or the terminal is configured with a new radio network temporary identifier (new-RNTI), the mcs-Table is an mcs-Table with the preset name bound to a waveform corresponding to a transformPrecoder in the second configuration field; otherwise, the mcs-Table is an mcs-Table in the second configuration field, wherein the preset name is qam64LowSE.

In addition, the determined parameter set for the retransmission further includes:

another parameter in the second configuration field other than the mcs-Table in the second configuration field.

In addition, the determined parameter set for the retransmission includes a number of repetitions for the retransmission;

the number of repetitions for the retransmission is one of:

a larger one of a number K of repetitions in the first configuration field and a number of repetitions of the PUSCH in the second configuration field;

a smaller one of the number K of repetitions in the first configuration field and the number of repetitions of the PUSCH in the second configuration field;

the number K of repetitions in the first configuration field; and the number of repetitions of the PUSCH in the second configuration field.

In addition, the determined parameter set for the retransmission further includes:

another parameter in the second configuration field other than the number of repetitions of the PUSCH in the second configuration field.

In some embodiments of the present disclosure, the determined parameter set for the retransmission includes:

a modulation and coding scheme table (mcs-Table), an mcs-TableTransformPrecoder, a waveform setting (transformPrecoder), an index of p0-PUSCH-AlphaSet (p0-PUSCH-Alpha), a powerControlLoopToUse and a path loss reference index (pathlossReferenceIndex) in the first configuration field; and another parameter in the second configuration field other than an mcs-Table, an mcs-TableTransformPrecoder, a transformPrecoder, a p0-PUSCH-Alpha, a powerControlLoopToUse, and a pathlossReferenceIndex in the second configuration field.

Embodiments of the present disclosure further provide a data retransmission device for a terminal, including:

a signaling acquisition module, configured to acquire a radio resource control (RRC) signaling, wherein the RRC signaling at least includes a first configuration field and a second configuration field; the first configuration field is a configured grant (ConfiguredGrantConfig) field, and the second configuration field is a physical uplink shared channel configuration (PUSCH-config) field;

a parameter determination module, configured to, in the case that a base station dynamically schedules the terminal to perform a retransmission of a PUSCH, determine a parameter set for the retransmission according to a configuration parameter included in the first configuration field and a configuration parameter included in the second configuration field; and a retransmission module, configured to perform the retransmission of the PUSCH according to the determined parameter set.

Embodiments of the present disclosure further provide a terminal including: a transceiver, a memory, a processor, and a computer program stored in the memory and capable of being executed by the processor, wherein the transceiver is configured to acquire a radio resource control (RRC) signaling, wherein the RRC signaling at least includes a first configuration field and a second configuration field; the first configuration field is a configured grant (ConfiguredGrantConfig) field, and the second configuration field is a physical uplink shared channel configuration (PUSCH-config) field;

the processor is configured to read the program in the memory to: in the case that a base station dynamically schedules the terminal to perform a retransmission of a PUSCH, determine a parameter set for the retransmission according to a configuration parameter included in the first configuration field and a configuration parameter included in the second configuration field; and perform the retransmission of the PUSCH according to the determined parameter set.

In addition, the determined parameter set for the retransmission includes:

another parameter in the first configuration field other than a first parameter set in the first configuration field; and a parameter that is in the second configuration field and corresponds to the first parameter set, wherein the first parameter set is a radio resource control-Configured Uplink Grant (rrc-ConfiguredUplinkGrant).

In addition, the determined parameter set for the retransmission includes:

a modulation and coding scheme table (mcs-Table) and a waveform setting (transformPrecoder) in the first configuration field; and another parameter in the second configuration field other than the mcs-Table and the transformPrecoder in the second configuration field.

In addition, the determined parameter set for the retransmission includes an mcs-Table;

when a waveform corresponding to a transformPrecoder in the first configuration field is same as a waveform corresponding to a transformPrecoder in the second configuration field, the mcs-Table is an mcs-Table in the first configuration field;

when the waveform corresponding to the transformPrecoder in the first configuration field is different from the waveform corresponding to the transformPrecoder in the second configuration field, the mcs-Table is an mcs-Table that is bound to the waveform corresponding to the transformPrecoder in the second configuration field and corresponds to the mcs-Table in the first configuration field.

In addition, the determined parameter set for the retransmission includes an mcs-Table;

when a name of an mcs-Table in the first configuration field is a preset name or the terminal is configured with a new radio network temporary identifier (new-RNTI), the mcs-Table is an mcs-Table with the preset name bound to a waveform corresponding to a transformPrecoder in the second configuration field; otherwise, the mcs-Table is an mcs-Table in the second configuration field, wherein the preset name is qam64LowSE.

In addition, the determined parameter set for the retransmission further includes:

another parameter in the second configuration field other than the mcs-Table in the second configuration.

In addition, the determined parameter set for the retransmission includes a number of repetitions for the retransmission;

the number of repetitions for the retransmission is one of:

a larger one of a number K of repetitions in the first configuration field and a number of repetitions of the PUSCH in the second configuration field;

a smaller one of the number K of repetitions in the first configuration field and the number of repetitions of the PUSCH in the second configuration field;

the number K of repetitions in the first configuration field; and the number of repetitions of the PUSCH in the second configuration field.

In addition, the determined parameter set for the retransmission further includes:

another parameter in the second configuration field other than the number of repetitions of the PUSCH in the second configuration field.

In some embodiments of the present disclosure, the determined parameter set for the retransmission includes:

a modulation and coding scheme table (mcs-Table), an mcs-TableTransformPrecoder, a waveform setting (transformPrecoder), an index of p0-PUSCH-AlphaSet (p0-PUSCH-Alpha), a powerControlLoopToUse and a path loss reference index (pathlossReferenceIndex) in the first configuration field; and another parameter in the second configuration field other than an mcs-Table, an mcs-TableTransformPrecoder, a transformPrecoder, a p0-PUSCH-Alpha, a powerControlLoopToUse, and a pathlossReferenceIndex in the second configuration field.

An embodiment of the present disclosure further provides a computer-readable storage medium storing therein a computer program, wherein the computer program is configured to be executed by a processor to implement steps of the above-mentioned data retransmission method.

The above technical solution of the present disclosure has at least the following beneficial effects:

according to the data retransmission method and device and the terminal of the embodiments of the present disclosure, in the PUSCH transmission scheme of using grant-free for the initial transmission and using dynamic scheduling for the retransmission, the parameter set for retransmission of the PUSCH is determined according to corresponding parameters in the ConfiguredGrantConfig and the PUSCH-config, so as to solve the problem that initial transmission of service data using the grant-free and retransmission of the service data using dynamic scheduling have different performances, and ensure the performances such as reliability, latency of PUSCH transmission with respect to both the initial transmission and the retransmission.

DETAILED DESCRIPTION

In order that make the technical problems to be solved by the present disclosure, and technical solutions and advantages of the present disclosure clearer, a detailed description will be given below in conjunction with the accompanying drawings and specific embodiments.

Figure 1:
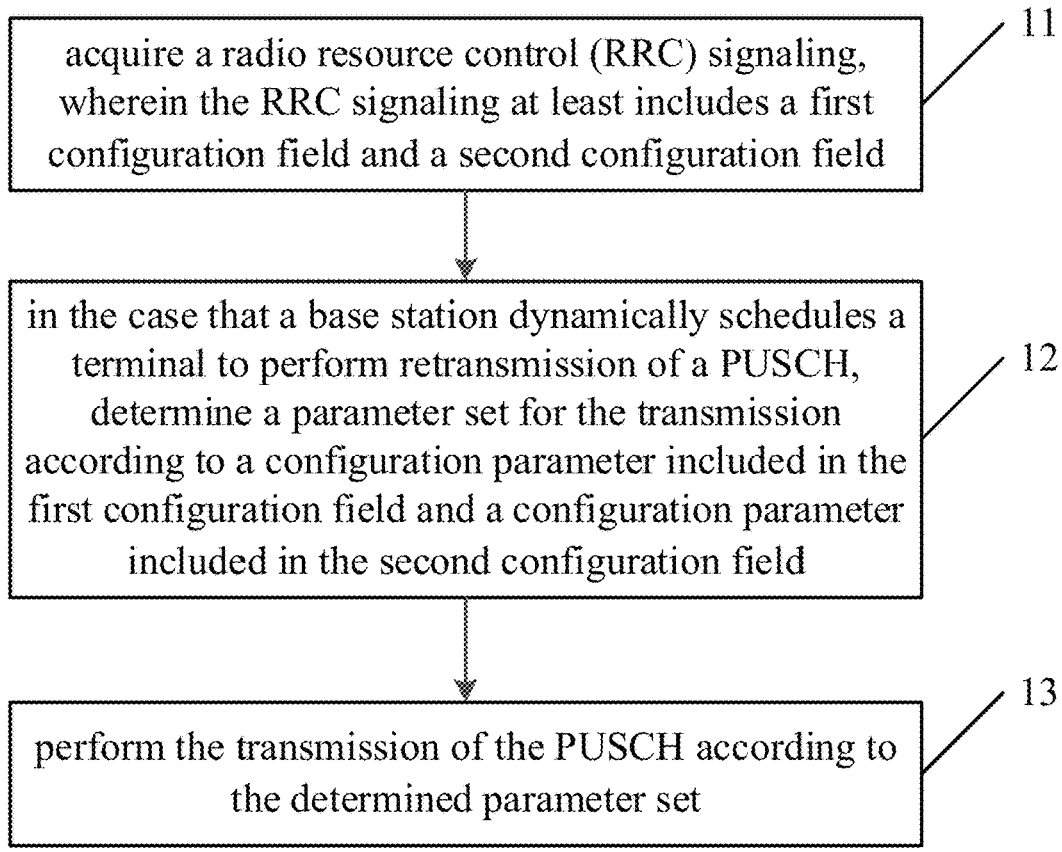
FIG. 1 is a flow chart of steps of a data retransmission method provided by an embodiment of the present disclosure.

As shown in FIG. 1, an embodiment of the present disclosure provides a data retransmission method for a terminal, including the following steps.

Step 11: acquiring a radio resource control (RRC) signaling, wherein the RRC signaling at least includes a first configuration field and a second configuration field; the first configuration field is a configured grant (ConfiguredGrantConfig) field, and the second configuration field is a physical uplink shared channel configuration (PUSCH-config) field.

In this step, a base station may configure the first configuration field and the second configuration field through different RRC signaling respectively, or may configure the first configuration field and the second configuration field through the same RRC signaling, which is not specifically limited herein.

In an embodiment, the base station configures the ConfiguredGrantConfig field required by the terminal for grant-free transmission, which includes Type 1 grant-free and Type 2 grant-free. The base station configures the PUSCH-config field required by the terminal for uplink dynamic scheduling. With respect to Type 2 grant-free, the base station further needs to transmit an active signaling to the terminal.

Step 12: in the case that the base station dynamically schedules the terminal to perform retransmission of a PUSCH, determining a parameter set for retransmission according to a configuration parameter included in the first configuration field and a configuration parameter included in the second configuration field.

Before step 12, for Type 1 grant-free, the terminal performs initial transmission of the PUSCH directly according to the RRC signaling carrying the ConfiguredGrantConfig field; for Type 2 grant-free, the terminal needs to perform the initial transmission of the PUSCH according to the RRC signaling carrying the ConfiguredGrantConfig field and the active signaling.

In an embodiment, in step 12, the base station uses a dynamic scheduling PDCCH to schedule the terminal to perform the retransmission of the PUSCH, and after receiving the dynamic scheduling of the base station, the terminal determines the parameter set for the retransmission according to the first configuration field and the second configuration field.

Step 13: performing the retransmission of the PUSCH according to the determined parameter set.

It is to be noted that the above-mentioned PUSCH carries service data, the base station schedules retransmission of the service data in a dynamic scheduling manner, and the terminal performs the retransmission of the service data on the PUSCH according to the determined parameter set.

It is further to be noted that the parameter set for retransmission determined in step 12 of the above-mentioned embodiment of the present disclosure can avoid the problem that the initial transmission of the service data using grant-free and the retransmission of the service data using dynamic scheduling have different performances, thereby ensuring the performances such as reliability, latency of the PUSCH transmission with respect to both the initial transmission and the retransmission.

In an embodiment, main parameters in the first configuration field provided by the embodiment of the present disclosure are shown in Table 1.

TABLE 1

ConfiguredGrantConfig Field Description antennaPort
Antenna port number with a maximum bit width of 5 bits.
cg-DMRS-Configuration
A demodulation reference signal (DMRS) configuration, corresponding to the L1 parameter "UL-TWG-DMRS".
configuredGrantTimer
An initial value of a configured grant timer (clock), an unit of which is a configuration period.
frequencyDomainAllocation
Frequency domain resource allocation.
frequencyHopping
Frequency hopping.
frequencyHoppingOffset
An Offset in intra-slot frequency hopping, corresponding to the L1 parameter "Frequency-hopping-offset".
mcs-Table
An MCS table for a CP-OFDM waveform, with a default of 64 QAM.
mcs-TableTransformPrecoder
A transform precoder of the MCS table for a DFT-S-OFDM waveform, with a default of 64 QAM.
mcsAndTBS
An MCS index.
nrofHARQ-Processes
Number of HARQ processes, with a maximum of 16.
p0-PUSCH-Alpha
An index of P0-PUSCH-AlphaSet, which is used for PUSCH power control.
periodicity
A resource allocation period, which corresponds to the L1 parameter "UL-TWG-periodicity", and supports multiple periodic configurations.
powerControlLoopToUse
A closed loop power control, corresponding to the L1 parameter "PUSCH-closed-loop-index".
rbg-Size
A size of PUSCH RBG, which is for a CP-OFDM waveform.
repK-RV
RV setting of repetitions of transmission.
repK
The number K of repetitions, which is selected from 1, 2, 4 and 8.
resourceAllocation
A resource allocation type of PUSCH, which is type 0 or type 1.
rrc-ConfiguredUplinkGrant
This parameter is for Type 1 grant-free only. When this parameter is not provided, Type 2 grant-free is used by default.
timeDomainAllocation
A time domain resource allocation, including SLIV and PUSCH mapping type.
timeDomainOffset
A starting position of the time domain resource with respect to SFN = 0.
transformPrecoder
A waveform setting.
uci-OnPUSCH
Whether a beta-offset is dynamic or semi-static.

In an embodiment, main parameters in the second configuration field provided by the embodiment of the present disclosure are shown in Table 2.

TABLE 2

PUSCH-Config Field Description codebookSubset
A subset of PMIs indicated by TPMI.
dataScramblingIdentityPUSCH
An ID for PUSCH scrambling sequence initialization, corresponding to the L1 parameter "Data-scrambling-Identity".
dmrs-UplinkForPUSCH-MappingTypeA
A DMRS configuration type for PUSCH mapping type A.
dmrs-UplinkForPUSCH-MappingTypeB
A DMRS configuration type for PUSCH mapping type B.
frequencyHopping
A frequency hopping type, a frequency hopping being not performed when the frequency hopping type being not provided, the frequency hopping type corresponding to the L1 parameter "Frequency-hopping-PUSCH".
frequencyHoppingOffsetLists
A frequency hopping offset set corresponding to the L1 parameter "Frequency-hopping-offsets-set".
maxRank
A maximum allowed rank, corresponding to the L1 parameter "ULmaxRank".
mcs-Table
An MCS table for a CP-OFDM waveform, which is with a default of 64 QAM, and corresponds to the L1 parameter "MCS-Table-PUSCH".
mcs-TableTransformPrecoder
A transform precoder of the MCS table for a DFT-S-OFDM waveform, which is with a default of 64 QAM, and corresponds to the L1 parameter "MCS-Table-PUSCH-transform-precoding".
pusch-AggregationFactor
Number of repetitions of PUSCH, corresponding to the L1 parameter "aggregation-factor-UL" with a default of 1.
pusch-AllocationList
A time domain resource allocation.
rbg-Size
A size of RBG.
resourceAllocation
A resource allocation type, which is type 0 or type 1, and corresponds to the L1 parameter "Resource-allocation-config".
tp-pi2PBSK
The pi/2-BPSK modulation is turned on for DFT-S-OFDM.
transformPrecoder
A waveform setting.
txConfig
A codebook or a non-codebook, corresponding to the L1 parameter "ulTxConfig".
uci-OnPUSCH
Whether a beta-offset is dynamic or semi-static.

Optionally, in the above embodiment of the present disclosure, the determined parameter set for the retransmission includes:

parameters other than a first parameter set in the first configuration field; and parameters corresponding to the first parameter set in the second configuration field;

The first parameter set is: a radio resource control-configured uplink grant (rrc-ConfiguredUplinkGrant).

For the configured PUSCH transmission, and with respect to the initial transmission based on the gran-free and the retransmission based on the dynamic scheduling, the retransmission of the terminal uses parameters common to Type 1 grant-free and Type 2 grant-free in the first configuration field, that is, the retransmission of the terminal will use parameters other than the rrc-ConfiguredUplinkGrant in the first configuration field, and the retransmission of the terminal will use parameters in the second configuration resource corresponding to the parameters included in the rrc-ConfiguredUplinkGrant.

Optionally, the rrc-ConfiguredUplinkGrant includes at least one of the following parameters:

time domain resource offset (timeDomainOffset);

time domain resource allocation (time Domain Allocation);

frequency domain resource allocation (frequencyDomainAllocation);

antenna port number (antennaPort);

demodulation reference signal-sequence number initialization (dmrs-SeqInitialization);

precoding and number of layers (precodingAndNumberOfLayers);

sounding reference signal resource indicator (srs-Resource Indicator);

modulation and coding scheme and transport block size (mcsAndTBS);

frequency hopping offset (frequencyHoppingOffset); and path loss reference index (pathlossReferenceIndex).

For parameters related to waveform indication during the retransmission of the terminal, the embodiment of the present disclosure provides at least three waveform indication schemes.

Scheme 1: the determined parameter set for the retransmission includes:

the modulation and coding scheme table (mcs-Table) and the waveform setting (transformPrecoder) in the first configuration field; and parameters other than the mcs-Table and the transformPrecoder in the second configuration field.

In short, in the scheme 1, for the configured PUSCH transmission, and with respect to the initial transmission based on the grant-free and the retransmission based on the scheduling, the retransmission of the terminal will use the parameter mcs-Table and the parameter transformPrecoder in the ConfiguredGrantConfig, and the other parameters will use the parameters in the RRC signaling PUSCH-Config.

Scheme 2: the determined parameter set for the retransmission includes: an mcs-Table;

when a waveform corresponding to the transformPrecoder in the first configuration field is same as a waveform corresponding to the transformPrecoder in the second configuration field, the mcs-Table is an mcs-Table in the first configuration field;

when the waveform corresponding to the transformPrecoder in the first configuration field is different from the waveform corresponding to the transformPrecoder in the second configuration field, the mcs-Table is an mcs-Table that is bound to the waveform corresponding to the transformPrecoder in the second configuration field and corresponds to the mcs-Table in the first configuration field. Optionally, the mcs-Table corresponding to the mcs-Table in the first configuration field is specifically an mcs-Table with the same lowest spectral efficiency (SE) as the mcs-Table in the first configuration field.

The determined parameter set for retransmission further includes:

parameters other than the mcs-Table in the second configuration field.

In short, in scheme 2, for the configured PUSCH transmission, and with respect to the initial transmission based on the grant-free and the retransmission based on the scheduling, if the waveforms of the initial transmission and the retransmission are the same, the retransmission of the terminal will use the parameter mcs-Table in the configured grant Config, and the other parameters will use the parameter in the PUSCH-Config; if the waveforms of the initial transmission and the retransmission are different, the retransmission of the terminal will use an mcs-Table bound to the waveform of the retransmission and with the same lowest spectral efficiency (SE) as the mcs-Table in the first configuration field.

For example, the lowest spectral efficiency (SE) of the mcs-Table in the first configuration field is 0.0586, and the mcs-Table bound to the waveform (i.e. the waveform of the retransmission) corresponding to the transformPrecoder in the second configuration field includes: a first and a second mcs-Tables; wherein, the lowest spectral efficiency (SE) of the first mcs-Table is 0.0586 and the lowest spectral efficiency (SE) of the second mcs-Table is 0.2344. If the waveforms of the initial transmission and the retransmission are different, the mcs-Table included in the determined parameter set for the retransmission is the first mcs-Table.

Scheme 3: the determined parameter set for the retransmission includes: an mcs-Table;

when a name of the mcs-Table in the first configuration field is a preset name or the terminal is configured with a new radio network temporary identifier (new-RNTI), the mcs-Table is an mcs-Table with the preset name bound to a waveform corresponding to the transformPrecoder in the second configuration field; otherwise, the mcs-Table is a mcs-Table in the second configuration field;

wherein the preset name is qam64LowSE.

The determined parameter set for retransmission further includes:

parameters other than the mcs-Table in the second configuration field, wherein qam64LowSE is Table 5.1.3.1-3 and Table 6.1.4.1-2 in 3GPP TS 38.214 v15.2.0, Table 5.1.3.1-3 is bound to a waveform CP-OFDM, and Table 6.1.4.1-2 is bound to a waveform DFT-S-OFDM.

In short, in scheme 3, for the configured PUSCH transmission, and with respect to the initial transmission based on the grant-free and the retransmission based on the scheduling, if the mcs-Table in the first configuration field is "qam64LowSE" or the terminal is configured with the new-RNTI, the mcs-Table included in the determined parameter set for the retransmission is the mcs-Table with the preset name bound to the waveform corresponding to the transformPrecoder in the second configuration field; if the mcs-Table in the first configuration field is not "qam64LowSE" and the terminal is not configured with the new-RNTI, the mcs-Table included in the determined parameter set for the retransmission is the mcs-Table in the second configuration field (i.e. the determined parameter set for the retransmission includes all the configuration parameter of the second configuration field).

Scheme 4: the determined parameter set for the retransmission includes:

the modulation and coding scheme table (mcs-Table), the mcs-TableTransformPrecoder, the waveform setting (transformPrecoder), the index of p0-PUSCH-AlphaSet (p0-PUSCH-Alpha), the powerControlLoopToUse, and the path loss reference index (pathlossReferenceIndex) in the first configuration field; and parameters other than the mcs-Table, the mcs-TableTransformPrecoder, the transformPrecoder, the p0-PUSCH-Alpha, the powerControlLoopToUse, and the pathlossReferenceIndex in the second configuration field.

In order to describe the waveform indication method in the above data retransmission method provided by the embodiment of the present disclosure in a clearer manner, a detailed description will be given below in conjunction with Example 1.

Example 1

In NR, there will be different RRC configurations corresponding to the grant-free and the dynamic scheduling respectively because of different application targets. For a waveform of the grant-free, a waveform being different from msg3 can be flexibly configured through the parameter transformPrecoder in the ConfiguredGrantConfig of the RRC signaling; for an UE configured with the ConfiguredGrantConfig, the dynamic scheduling may still be used, and a waveform used in dynamic scheduling is determined by the parameter transformPrecoder in the RRC signaling PUSCH-Config.

Specifically, a waveform of Msg3 is given by the parameter msg3-transformPrecoding in the RRC signaling RACH-ConfigCommon; a waveform of the PUSCH of the dynamically scheduling is given by the parameter transformPrecoder in the RRC signaling PUSCH-Config, and if this parameter is not present, the waveform of msg3 is used; if this parameter is present and enabled, the transmit precoding is used; if this parameter is present and disabled, the transform precoding is not used.

On one hand, the waveform of the configured PUSCH is given by the parameter transformPrecoder in the RRC signaling ConfiguredGrantConfig, and if this parameter is not present, the transformprecoding is not used.

On the other hand, in order to ensure reliability, for the configured PUSCH transmission, the MCS table is given by the parameter mcs-Table in the RRC signaling ConfiguredGrantConfig with respect to both the initial transmission based on the grant-free and the retransmission based on the dynamical scheduling; because the mcs-Table is bound to the waveform, the waveform should be given by the parameter transformPrecoder in the RRC signaling ConfiguredGrantConfig for the retransmission of the configured PUSCH or for initial transmission of the configured PUSCH. If this parameter is present and "enabled", the transform precoding is used, otherwise, the transform precoding is not used.

Based on the above description, it can be seen that the above two waveform determination methods are contradictory, the former can provide flexibility in the retransmission and the latter can ensure the reliability of the transmission, and therefore, the embodiment of the present disclosure further provides a waveform selection mode.

For example, for the configured PUSCH transmission, the initial transmission based on the gran-free and the retransmission based on the scheduling, the retransmission of the UE will use parameters common to Type 1 and Type 2 in the RRC signaling ConfiguredGrant, i.e. parameters other than rrc-ConfiguredUplinkGrant in the ConfiguredGrantConfig; for other parameters, the retransmission of the terminal will use the parameters in the RRC signaling PUSCH-Config.

As another example, the retransmission of the terminal will all use the parameters in the RRC signaling PUSCH-Config with one exception, namely: if the parameter mcs-Table in the RRC signaling ConfiguredGrantConfig is "qam64LowSE" or the UE is configured with a new-RNTI, the terminal selects one mcs-Table from two low-SE MCS tables; the selected mcs-Table is: the mcs-Table with the preset name bound to the waveform corresponding to the transformPrecoder in the second configuration field.

In an embodiment, when the number K of repetitions in the first configuration field and the number of repetitions of the PUSCH in the second configuration field are different, in order to avoid different performances of the initial transmission and the retransmission, the embodiment of the present disclosure further provides an indication method of the number of repetitions:

that is, the determined parameter set for the retransmission includes: the number of repetitions for the retransmission;

The number of repetitions for the retransmission is one of the following:

a larger one of a number K of repetitions in the first configuration field and a number of repetitions of the PUSCH in the second configuration field;

a smaller one of the number K of repetitions in the first configuration field and the number of repetitions of the PUSCH in the second configuration field;

the number K of repetitions in the first configuration field; and the number of repetitions of the PUSCH in the second configuration field.

Accordingly, the determined parameter set for the retransmission further includes:

another parameter other than the number of repetitions of the PUSCH in the second configuration field.

Specifically, for the configured PUSCH transmission, and with respect to the initial transmission based on the grant-free and the retransmission based on the scheduling, the retransmission of the terminal will use the larger one between the parameter pusch-AggregationFactor (the number of repetitions of the PUCCH) in the PUSCH-Config and the parameter repK (the number K of repetitions) in the ConfiguredGrantConfig as the number of repetitions (i.e. number of multiple time slots) for the retransmission of the terminal, and other parameters will use the parameters in the PUSCH-Config.

Alternatively, for configured PUSCH transmission, the initial transmission based on grant-free and the retransmission based on scheduling, the retransmission of the UE will use the parameter repK in the ConfiguredGrantConfig as the number of repetitions (i.e. the number of multiple time slots) for the retransmission of the terminal, and other parameters will use the parameters in the PUSCH-Config.

Alternatively, for the configured PUSCH transmission, and with respect to the initial transmission based on the grant-free and the retransmission based on the scheduling, the retransmission of the UE will use the pusch-AggregationFactor (the number of repetitions of the PUCCH) in the PUSCH-Config as the number of repetitions (i.e. the number of multiple time slots) for the retransmission of the terminal, and other parameters will use the parameters in the PUSCH-Config.

Alternatively, for configured PUSCH transmission, and with respect to the initial transmission based on the grant-free and the retransmission based on the scheduling, the retransmission of the UE will use the smaller one between the parameter pusch-AggregationFactor in the PUSCH-Config and the parameter repK in the ConfiguredGrantConfig as the number of repetitions (i.e. the number of multiple time slots) for the retransmission of the terminal, and other parameters will use the parameters in the PUSCH-Config.

In order to describe the indication method of the number of repetitions in the above data retransmission method provided by the embodiment of the present disclosure in a clearer manner, the following is described in detail in conjunction with Example 2.

Example 2

In NR, there will be different RRC configurations corresponding to the grant-free and the dynamic scheduling respectively because of different application targets. In order to improve coverage or reliability, for the uplink dynamic scheduling, the number of multiple time slots occupied by one transmission is determined according to the parameter pusch-AggregationFactor in the RRC signaling PUSCH-Config, multiple repetitions of a transmission are performed on the multiple time slots, and the initial transmission and the retransmission use the same number of multiple time slots. For the grant-free, the parameter repK in the RRC signaling ConfiguredGrantConfig is similar to the parameter pusch-AggregationFactor.

For the configured PUSCH transmission, and with respect to the initial transmission based on the grant-free and the retransmission based on the scheduling, the initial transmission uses the parameter repK in the RRC signaling ConfiguredGrantConfig to determine the number of multiple time slots, the retransmission uses the parameter pusch-AggregationFactor in the RRC signaling PUSCH-Config to determine the number of multiple time slots, then when repK-≠pusch-AggregationFactor, the two determination methods for the multiple time slots are mutually contradictory, and therefore, the design for selecting the number of multiple time slots is further needed.

For the configured PUSCH transmission, and with respect to the initial transmission based on the grant-free and the retransmission based the scheduling, the retransmission of the UE uses the larger one between the parameter pusch-AggregationFactor in the RRC signaling PUSCH-Config and the parameter repK in the RRC signaling ConfiguredGrantConfig.

In summary, in the above-mentioned embodiment of the present disclosure, in the PUSCH transmission scheme of using grant-free for the initial transmission and using dynamic scheduling for the retransmission, the parameter set for retransmission of the PUSCH is determined according to corresponding parameters in the ConfiguredGrantConfig and the PUSCH-config, so as to solve the problem that initial transmission of service data using the grant-free and retransmission of the service data using the dynamic scheduling have different performances, and ensure the performances such as reliability, latency of PUSCH transmission with respect to both the initial transmission and the retransmission.

Figure 2:
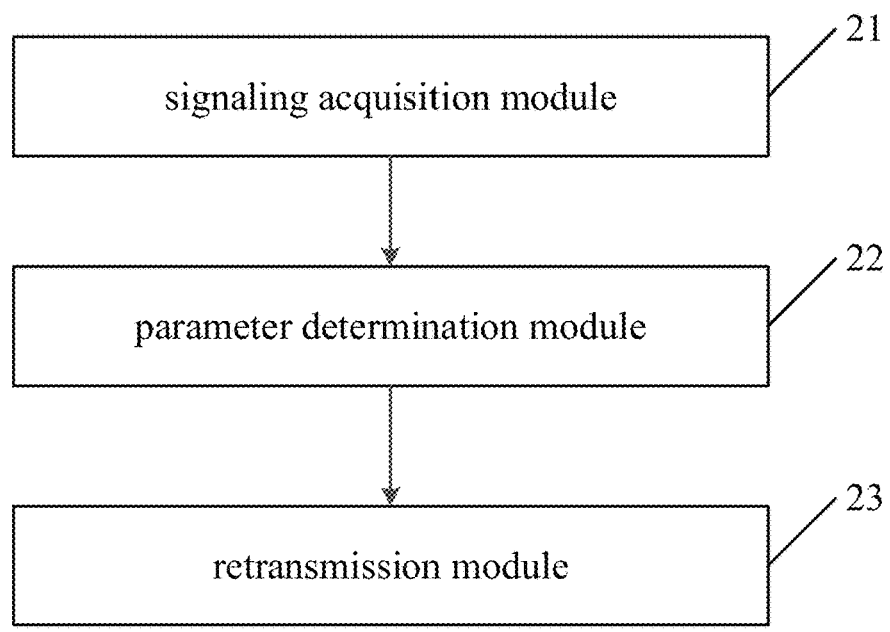
FIG. 2 is a schematic structural diagram of a data retransmission device provided by an embodiment of the present disclosure.

As shown in FIG. 2, an embodiment of the present disclosure further provides a data retransmission device for a terminal, including:

a signaling acquisition module 21, configured to acquire a radio resource control (RRC) signaling, wherein the RRC signaling includes at least a first configuration field and a second configuration field; the first configuration field is a configured grant (ConfiguredGrantConfig) field, and the second configuration field is a physical uplink shared channel configuration (PUSCH-config) field;

a parameter determination module 22, configured to, in the case that a base station dynamically schedules the terminal to perform retransmission of a PUSCH, determine a parameter set for retransmission according to a configuration parameter included in the first configuration field and a configuration parameter included in the second configuration field; and a retransmission module 23, configured to perform the retransmission of the PUSCH according to the determined parameter set.

Optionally, in the above embodiment of the present disclosure, the determined parameter set for the retransmission includes:

parameters other than a first parameter set in the first configuration field;

and parameters corresponding to the first parameter set in the second configuration field;

the first parameter set is: a radio resource control-Configured Uplink Grant (rrc-ConfiguredUplinkGrant).

Optionally, in the above embodiment of the present disclosure, the determined parameter set for the retransmission includes:

a modulation and coding scheme table (mcs-Table) and waveform setting (transformPrecoder) in the first configuration field; and parameters other than an mcs-Table and a transformPrecoder in the second configuration field.

Optionally, in the above embodiment of the present disclosure, the determined parameter set for the retransmission includes: an mcs-Table;

when a waveform corresponding to a transformPrecoder in the first configuration field is same as a waveform corresponding to a transformPrecoder in the second configuration field, the mcs-Table is an mcs-Table in the first configuration field;

when the waveform corresponding to the transformPrecoder in the first configuration field is different from the waveform corresponding to the transformPrecoder in the second configuration field, the mcs-Table is an mcs-Table that is bound to the waveform corresponding to the transformPrecoder in the second configuration field and corresponds to the mcs-Table in the first configuration field.

Optionally, in the above embodiment of the present disclosure, the determined parameter set for the retransmission includes: an mcs-Table;

when a name of an mcs-Table in the first configuration field is a preset name or the terminal is configured with a new radio network temporary identifier (new-RNTI), the mcs-Table is an mcs-Table with the preset name bound to a waveform corresponding to a transformPrecoder in the second configuration field; otherwise, the mcs-Table is an mcs-Table in the second configuration field;

wherein the preset name is qam64LowSE.

Optionally, in the above embodiment of the present disclosure, the determined parameter set for the retransmission further includes:

parameters other than the mcs-Table in the second configuration field.

Optionally, in the above embodiment of the present disclosure, the determined parameter set for the retransmission includes: number of repetitions for the retransmission;

The number of repetitions for the retransmission is one of the following:

a larger one of a number K of repetitions in the first configuration field and a number of repetitions of the PUSCH in the second configuration field;

a smaller one of the number K of repetitions in the first configuration field and the number of repetitions of the PUSCH in the second configuration field;

the number K of repetitions in the first configuration field; and the number of repetitions of the PUSCH in the second configuration field.

Optionally, in the above embodiment of the present disclosure, the determined parameter set for the retransmission further includes:

parameters other than the number of repetitions of the PUSCH in the second configuration field.

In summary, in the above embodiment of the present disclosure, in the PUSCH transmission scheme of using grant-free for the initial transmission and using dynamic scheduling for the retransmission, the parameter set for retransmission of the PUSCH is determined according to corresponding parameters in the ConfiguredGrantConfig and the PUSCH-config, so as to solve the problem that initial transmission of service data using the grant-free and retransmission of the service data using the dynamic scheduling have different performances, and ensure the performances such as reliability, latency of PUSCH transmission with respect to both the initial transmission and the retransmission.

It should be noted that the data retransmission device provided by the embodiment of the present disclosure is a device capable of executing the above data retransmission method, and all the embodiments of the above data retransmission method are applicable to the device and can achieve the same or similar beneficial effects.

Figure 3:
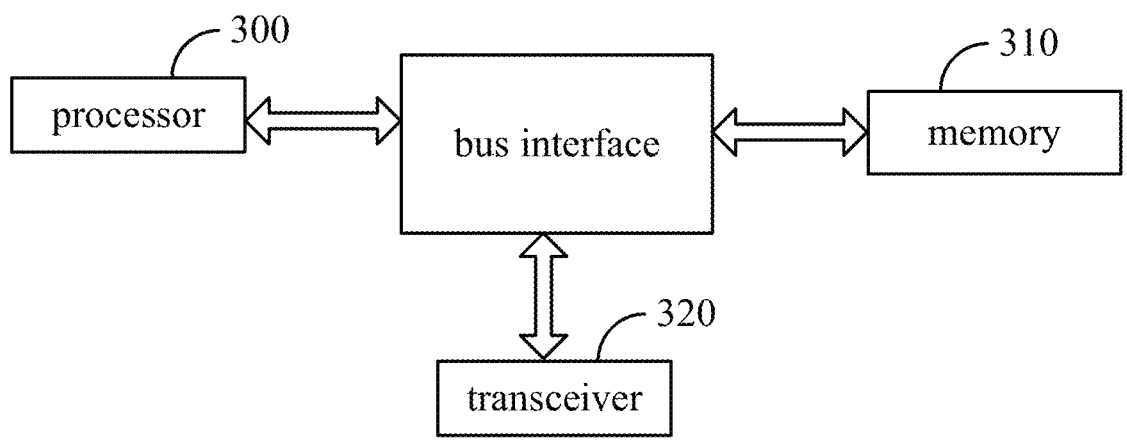
FIG. 3 is a schematic structural diagram of a terminal provided by an embodiment of the present disclosure.

As shown in FIG. 3, an embodiment of the present disclosure further provides a terminal including: a transceiver 320; a memory 310; a processor 300; and a computer program stored in the memory 310 and capable of being executed by the processor 300; wherein the transceiver 320 is configured to acquire a radio resource control (RRC) signaling, the RRC signaling at least includes a first configuration field and a second configuration field; the first configuration field is a configured grant (ConfiguredGrant-Config) field, and the second configuration field is a physical uplink shared channel configuration (PUSCH-config) field;

The processor 300 is configured to read the program in memory to implement a following process: in the case that the base station dynamically schedules the terminal to perform retransmission of a PUSCH, a parameter set for retransmission is determined according to a configuration parameter included in the first configuration field and a configuration parameter included in the second configuration field; and the retransmission of the PUSCH is performed according to the determined parameter set.

Optionally, in the above embodiment of the present disclosure, the determined parameter set for the retransmission includes:

parameters other than a first parameter set in the first configuration field; and parameters corresponding to the first parameter set in the second configuration field;

the first parameter set is: a radio resource control-Configured Uplink Grant (rrc-ConfiguredUplinkGrant).

Optionally, in the above embodiment of the present disclosure, the determined parameter set for the retransmission includes:

a modulation and coding scheme table (mcs-Table) and waveform setting (transformPrecoder) in the first configuration field; and parameters other than an mcs-Table and a transformPrecoder in the second configuration field.

Optionally, in the above embodiment of the present disclosure, the determined parameter set for the retransmission includes: an mcs-Table;

when a waveform corresponding to a transformPrecoder in the first configuration field is same as a waveform corresponding to a transformPrecoder in the second configuration field, the mcs-Table is an mcs-Table in the first configuration field;

when the waveform corresponding to the transformPrecoder in the first configuration field is different from the waveform corresponding to the transformPrecoder in the second configuration field, the mcs-Table is an mcs-Table that is bound to the waveform corresponding to the transformPrecoder in the second configuration field and corresponds to the mcs-Table in the first configuration field.

Optionally, in the above embodiment of the present disclosure, the determined parameter set for the retransmission includes: an mcs-Table;

when a name of an mcs-Table in the first configuration field is a preset name or the terminal is configured with a new radio network temporary identifier (new-RNTI), the mcs-Table is an mcs-Table with the preset name bound to a waveform corresponding to a transformPrecoder in the second configuration field; otherwise, the mcs-Table is an mcs-Table in the second configuration field;

wherein the preset name is qam64LowSE.

Optionally, in the above embodiment of the present disclosure, the determined parameter set for the retransmission further includes:

parameters other than the mcs-Table in the second configuration field.

Optionally, in the above embodiment of the present disclosure, the determined parameter set for the retransmission includes: number of repetitions for the retransmission;

The number of repetitions for the retransmission is one of the following:

a larger one of a number K of repetitions in the first configuration field and a number of repetitions of the PUSCH in the second configuration field;

a smaller one of the number K of repetitions in the first configuration field and the number of repetitions of the PUSCH in the second configuration field;

the number K of repetitions in the first configuration field; and the number of repetitions of the PUSCH in the second configuration field.

Optionally, in the above embodiment of the present disclosure, the determined parameter set for the retransmission further includes:

parameters other than the number of repetitions of the PUSCH in the second configuration field.

Optionally, the determined parameter set for the retransmission includes:

a modulation and coding strategy table (mcs-Table), an mcs-TableTransformPrecoder, waveform setting (transformPrecoder), an index of p0-PUSCH-AlphaSet (p0-PUSCH-Alpha), powerControlLoopToUse and a path loss reference index (pathlossReferenceIndex) in the first configuration field; and parameters other than an mcs-Table, an mcs-TableTransformPrecoder, a transformPrecoder, p0-PUSCH-Alpha, powerControlLoopToUse, and a pathlossReferenceIndex in the second configuration field.

In summary, in the above embodiment of the present disclosure, in the PUSCH transmission scheme of using grant-free for the initial transmission and using dynamic scheduling for the retransmission, the parameter set for retransmission of the PUSCH is determined according to corresponding parameters in the ConfiguredGrantConfig and the PUSCH-config, so as to solve the problem that initial transmission of service data using the grant-free and retransmission of the service data using dynamic scheduling have different performances, and ensure the performances such as reliability, latency of PUSCH transmission with respect to both the initial transmission and the retransmission.

It should be noted that the terminal provided by the embodiment of the present disclosure is a terminal capable of executing the above data retransmission method, and all the embodiments of the above data retransmission method are applicable to the terminal and can achieve the same or similar beneficial effects.

An embodiment of the present disclosure further provide a computer-readable storage medium storing therein a computer program, when the computer program is configured to be executed by a processor, to implement the respective process of the above embodiments of the data retransmission method, and the same technical effects can be achieved, which will not be described in detail herein in order to avoid repetition. The computer-readable storage medium is a read-only memory (ROM), a random access memory (RAM), a magnetic disk, an optical disk, or the like.

It should be noted that, the terms "include", "includes", or any other variation thereof herein are intended to cover a non-exclusive inclusion, such that a process, method, article, or device that includes a list of elements includes not only these elements but also other elements not expressly listed or elements inherent to such process, method, article, or device. An element defined by the phrase "include one . . . " does not, without more constraints, preclude the existence of additional identical elements in the process, method, article, or device that includes the element.

From the above description of the embodiments, it will be clear to a person skilled in the art that the methods of the above embodiments can be implemented by means of software plus a necessary general hardware platform, or by means of hardware, but the former may be more preferable in many cases. Based on this understanding, the technical solution of the present disclosure essentially or the part that contributes to the related art can be embodied in the form of a software product, and the computer software product is stored in a storage medium (such as ROM/RAM, magnetic disk, optical disk), and includes instructions to enable a terminal (which can be a mobile phone, a computer, a server, an air conditioner, or a network device, etc.) to execute the method described in the embodiments of the present disclosure.

The embodiments of the present disclosure are described above with reference to the drawings, but the present disclosure is not limited to the above-mentioned specific embodiments. The above-mentioned specific embodiments are only illustrative and not restrictive. Under the teaching of the present disclosure, a person skilled in the art may implement many forms without departing from the principle of the present disclosure and the protection scope of the claims, all of which fall within the protection of the present disclosure.

The above are optional implementations of the present disclosure. It should be pointed out that a person skilled in the art may made modifications and improvements without departing from the principles described in the present disclosure. These modifications and improvements should also fall within the protection scope of the present disclosure.

What is claimed is:

1. A data retransmission method for a terminal, comprising:
　acquiring a radio resource control (RRC) signaling, wherein the RRC signaling at least comprises a first configuration field and a second configuration field; the first configuration field is a configured grant (ConfiguredGrantConfig) field, and the second configuration field is a physical uplink shared channel configuration (PUSCH-config) field;
　in the case that a base station dynamically schedules the terminal to perform a retransmission of a PUSCH, determining a parameter set for the retransmission according to a configuration parameter comprised in the first configuration field and a configuration parameter comprised in the second configuration field; and
　performing the retransmission of the PUSCH according to the determined parameter set.

2. The data retransmission method according to claim 1, wherein the determined parameter set for the retransmission comprises:
　another parameter in the first configuration field other than a first parameter set in the first configuration field; and
　a parameter that is in the second configuration field and corresponds to the first parameter set,
　wherein the first parameter set is a radio resource control-Configured Uplink Grant (rrc-ConfiguredUplinkGrant).

3. The data retransmission method according to claim 1, wherein the determined parameter set for the retransmission comprises:
　a modulation and coding scheme table (mcs-Table) and a waveform setting (transformPrecoder) in the first configuration field; and
　another parameter in the second configuration field other than the mcs-Table and the transformPrecoder in the second configuration field.

4. The data retransmission method according to claim 1, wherein the determined parameter set for the retransmission comprises an mcs-Table;
　when a waveform corresponding to a transformPrecoder in the first configuration field is same as a waveform corresponding to a transformPrecoder in the second configuration field, the mcs-Table is an mcs-Table in the first configuration field;
　when the waveform corresponding to the transformPrecoder in the first configuration field is different from the waveform corresponding to the transformPrecoder in the second configuration field, the mcs-Table is an mcs-Table that is bound to the waveform corresponding to the transformPrecoder in the second configuration field and corresponds to the mcs-Table in the first configuration field.

5. The data retransmission method according to claim 1, wherein the determined parameter set for the retransmission comprises an mcs-Table;
　when a name of an mcs-Table in the first configuration field is a preset name or the terminal is configured with a new radio network temporary identifier (new-RNTI), the mcs-Table is an mcs-Table with the preset name bound to a waveform corresponding to a transformPrecoder in the second configuration field; otherwise, the mcs-Table is an mcs-Table in the second configuration field,
　wherein the preset name is qam64LowSE.

6. The data retransmission method according to claim 4, wherein the determined parameter set for the retransmission further comprises:
　another parameter in the second configuration field other than the mcs-Table in the second configuration field.

7. The data retransmission method according to claim 1, wherein the determined parameter set for the retransmission comprises a number of repetitions for the retransmission;
　the number of repetitions for the retransmission is one of:
　a larger one of a number K of repetitions in the first configuration field and a number of repetitions of the PUSCH in the second configuration field;
　a smaller one of the number K of repetitions in the first configuration field and the number of repetitions of the PUSCH in the second configuration field;
　the number K of repetitions in the first configuration field; and
　the number of repetitions of the PUSCH in the second configuration field.

8. The data retransmission method according to claim 7, wherein the determined parameter set for the retransmission further comprises:
another parameter in the second configuration field other than the number of repetitions of the PUSCH in the second configuration field.

9. The data retransmission method according to claim 1, wherein the determined parameter set for the retransmission comprises:
a modulation and coding scheme table (mcs-Table), an mcs-TableTransformPrecoder, a waveform setting (transformPrecoder), an index of p0-PUSCH-AlphaSet (p0-PUSCH-Alpha), a powerControlLoopToUse and a path loss reference index (pathlossReferenceIndex) in the first configuration field; and
another parameter in the second configuration field other than an mcs-Table, an mcs-TableTransformPrecoder, a transformPrecoder, a p0-PUSCH-Alpha, a powerControlLoopToUse, and a pathlossReferenceIndex in the second configuration field.

10. A terminal, comprising: a transceiver, a memory, a processor and a computer program stored in the memory and capable of being executed by the processor; wherein
the transceiver is configured to acquire a radio resource control (RRC) signaling, wherein the RRC signaling at least comprises a first configuration field and a second configuration field; the first configuration field is a configured grant (ConfiguredGrantConfig) field, and the second configuration field is a physical uplink shared channel configuration (PUSCH-config) field;
the processor is configured to read the program in the memory to:
in the case that a base station dynamically schedules the terminal to perform a retransmission of a PUSCH, determine a parameter set for the retransmission according to a configuration parameter comprised in the first configuration field and a configuration parameter comprised in the second configuration field; and
perform the retransmission of the PUSCH according to the determined parameter set.

11. The terminal according to claim 10, wherein the determined parameter set for the retransmission comprises:
another parameter in the first configuration field other than a first parameter set in the first configuration field; and
a parameter that is in the second configuration field and corresponds to the first parameter set,
wherein the first parameter set is a radio resource control-Configured Uplink Grant (rrc-ConfiguredUplinkGrant).

12. The terminal according to claim 11, wherein the determined parameter set for the retransmission comprises:
a modulation and coding scheme table (mcs-Table) and a waveform setting (transformPrecoder) in the first configuration field; and
another parameter in the second configuration field other than the mcs-Table and the transformPrecoder in the second configuration field.

13. The terminal according to claim 10, wherein the determined parameter set for the retransmission comprises an mcs-Table;
when a waveform corresponding to a transformPrecoder in the first configuration field is same as a waveform corresponding to a transformPrecoder in the second configuration field, the mcs-Table is an mcs-Table in the first configuration field;

when the waveform corresponding to the transformPrecoder in the first configuration field is different from the waveform corresponding to the transformPrecoder in the second configuration field, the mcs-Table is an mcs-Table that is bound to the waveform corresponding to the transformPrecoder in the second configuration field and corresponds to the mcs-Table in the first configuration field.

14. The terminal according to claim 10, wherein the determined parameter set for the retransmission comprises an mcs-Table;
when a name of an mcs-Table in the first configuration field is a preset name or the terminal is configured with a new radio network temporary identifier (new-RNTI), the mcs-Table is an mcs-Table with the preset name bound to a waveform corresponding to a transformPrecoder in the second configuration field; otherwise, the mcs-Table is an mcs-Table in the second configuration field,
wherein the preset name is qam64LowSE.

15. The terminal according to claim 13, wherein the determined parameter set for the retransmission further comprises:
another parameter in the second configuration field other than the mcs-Table in the second configuration field.

16. The terminal according to claim 10, wherein the determined parameter set for the retransmission comprises a number of repetitions for the retransmission;
the number of repetitions for the retransmission is one of:
a larger one of a number K of repetitions in the first configuration field and a number of repetitions of the PUSCH in the second configuration field;
a smaller one of the number K of repetitions in the first configuration field and the number of repetitions of the PUSCH in the second configuration field;
the number K of repetitions in the first configuration field; and
the number of repetitions of the PUSCH in the second configuration field.

17. The terminal according to claim 16, wherein the determined parameter set for the retransmission further comprises:
another parameter in the second configuration field other than the number of repetitions of the PUSCH in the second configuration field.

18. The terminal according to claim 10, wherein the determined parameter set for the retransmission comprises:
a modulation and coding scheme table (mcs-Table), an mcs-TableTransformPrecoder, a waveform setting (transformPrecoder), an index of p0-PUSCH-AlphaSet (p0-PUSCH-Alpha), a powerControlLoopToUse and a path loss reference index (pathlossReferenceIndex) in the first configuration field; and
another parameter in the second configuration field other than an mcs-Table, an mcs-TableTransformPrecoder, a transformPrecoder, a p0-PUSCH-Alpha, a powerControlLoopToUse, and a pathlossReferenceIndex in the second configuration field.

19. A computer readable storage medium storing therein a computer program, wherein the computer program is configured to be executed by a processor to implement steps of the data retransmission method according to claim 1.

20. The data retransmission method according to claim 5, wherein the determined parameter set for the retransmission further comprises:

another parameter in the second configuration field other than the mcs-Table in the second configuration field.

\* \* \* \* \*